July 12, 1932.  C. R. BUSCH  1,866,999
BRAKE MECHANISM FOR RAILWAY CARS
Filed June 9, 1928  3 Sheets-Sheet 1
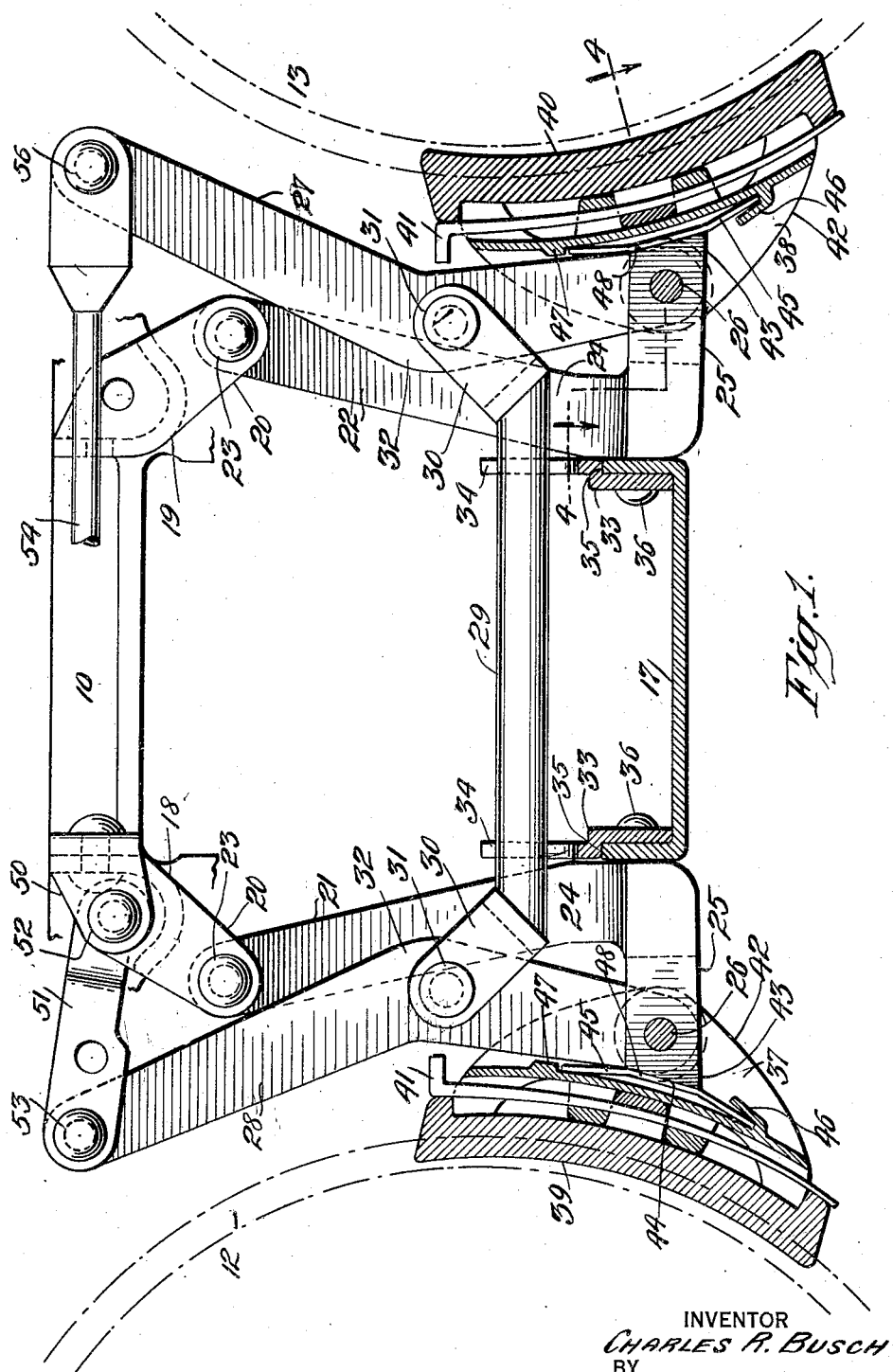
INVENTOR
CHARLES R. BUSCH
BY
Geo. L. Wheelock
ATTORNEY

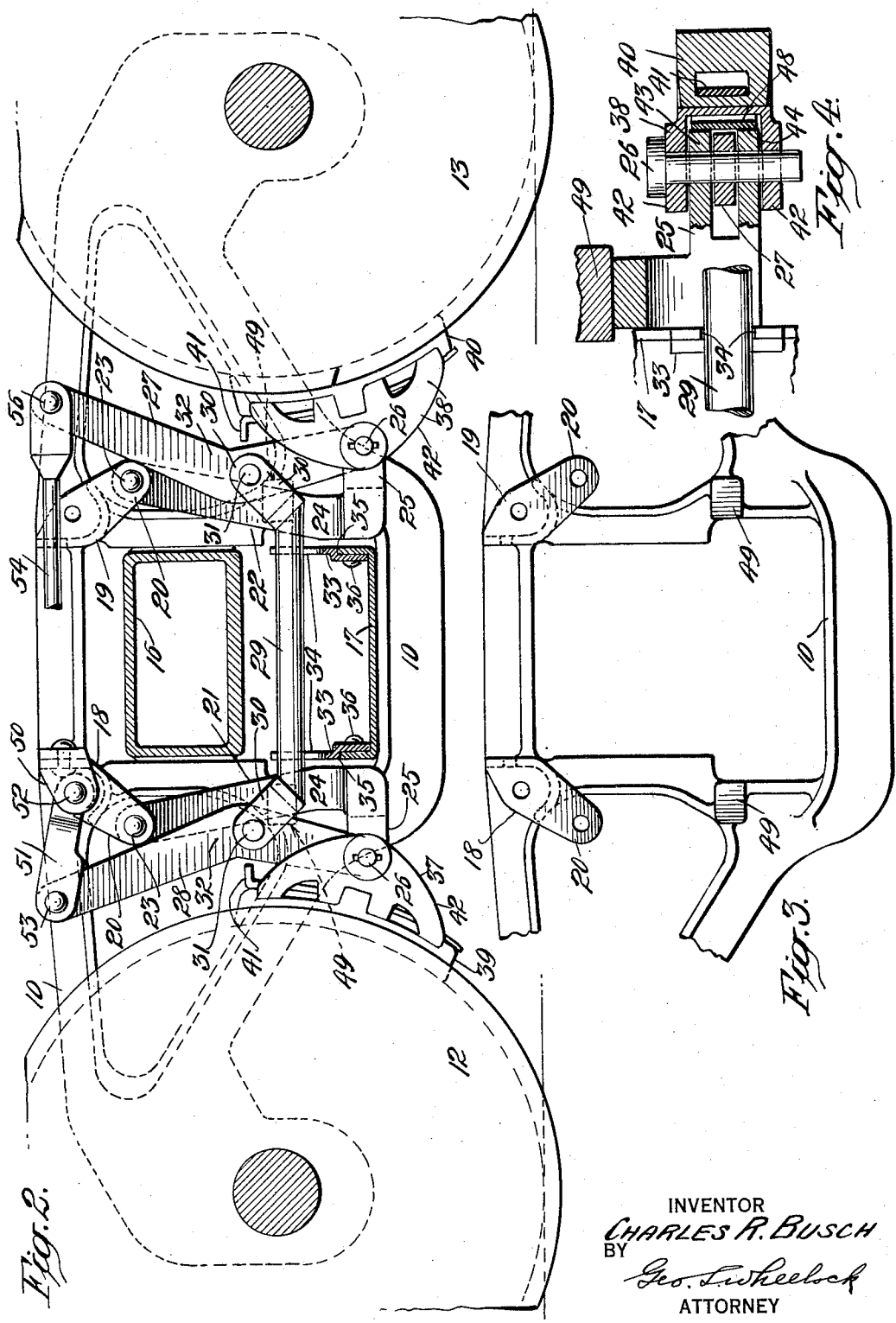

July 12, 1932.  C. R. BUSCH  1,866,999
BRAKE MECHANISM FOR RAILWAY CARS
Filed June 9, 1928   3 Sheets-Sheet 3
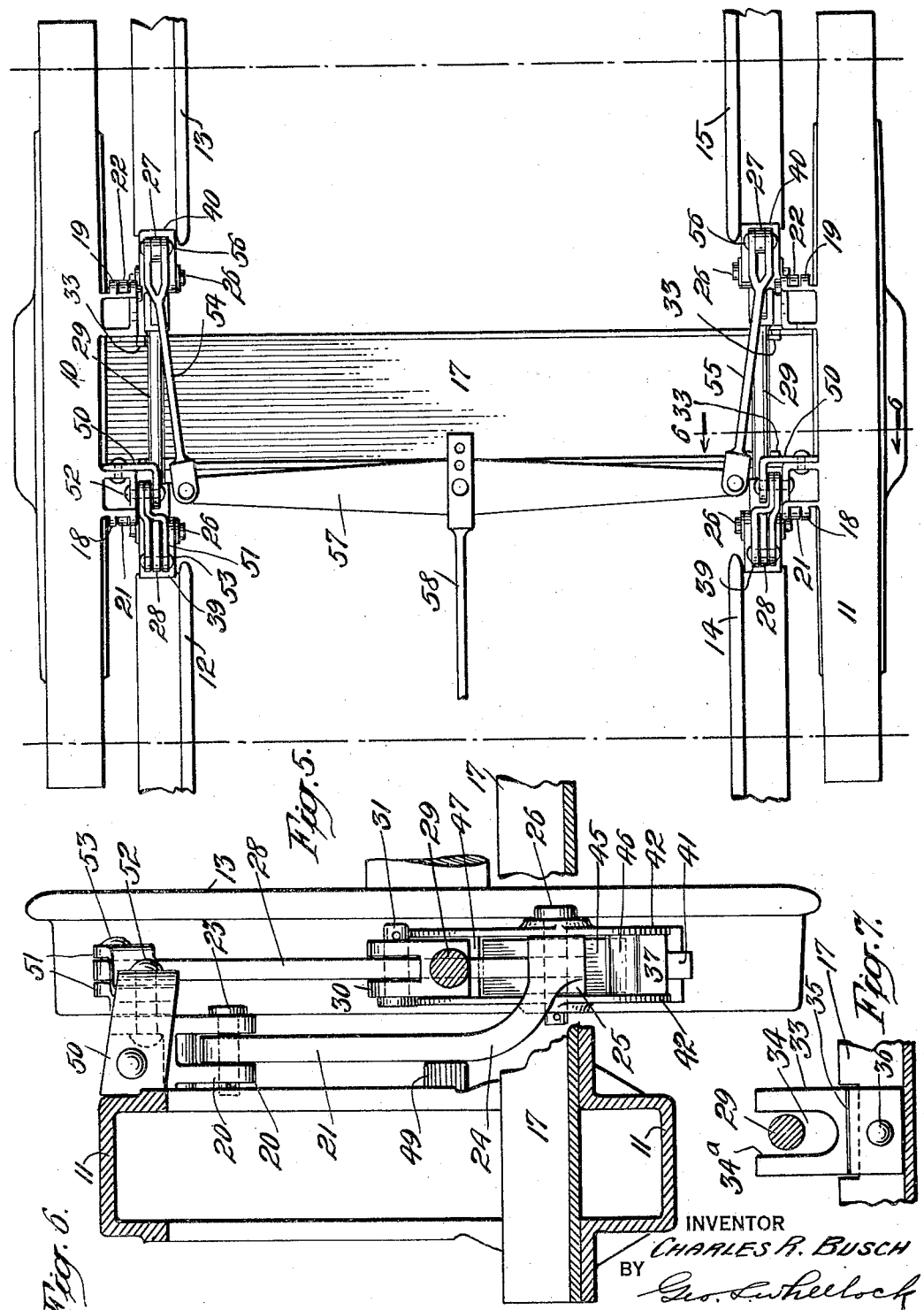

Patented July 12, 1932

1,866,999

UNITED STATES PATENT OFFICE

CHARLES R. BUSCH, OF ORANGE, NEW JERSEY, ASSIGNOR TO BUFFALO BRAKE BEAM COMPANY, OF NEW YORK, N. Y., A CORPORATION OF NEW YORK

BRAKE MECHANISM FOR RAILWAY CARS

Application filed June 9, 1928. Serial No. 284,066.

The present invention relates to braking mechanism for railway cars and which is of the inside hung type, and is more particularly adapted for four-wheel trucks. In four-wheel trucks it has been one of the aims to dispense with the necessity of brake beams, and due to the fact that there is a very limited space for movement of the braking mechanism between the car wheels at each side, and also due to the fact that the bolster and spring plank and concomitant parts further restrict the space, it has been attempted heretofore to adapt the braking mechanism to the contracted space which is allowed by the construction, but so far as I am aware the previous attempts to accommodate the braking mechanism to the contracted space have not been entirely successful, and present some disadvantages, which it is the object of the present invention to overcome.

Among the objects of the present invention are the following:

To provide a unitary braking mechanism at each side of the car truck and which is suspended in its entirety from the side frame of the truck, the rigidity of the side frame being utilized for the purpose of providing fixed points for taking off and reliably maintaining restricted controlled movements within the limited space allowed in the truck;

To provide hangers and levers which are specifically designed and offset to accommodate themselves to the restricted space allowed in the truck, and yet obtain a full braking action on the car wheels;

To provide a system of hangers and brake levers wherein a hanger is pivotally connected with a brake-lever by one pin which constitutes the sole support for the brake head, the brake-head being maintained by simple means in proper braking position relative to the wheel on which its brake-shoe acts;

To provide stationary guides, such as wear surfaces or the like, respectively, for each hanger and brake-lever, so as to substantially restrict the plane of action of the corresponding brake-head to substantially the vertical plane of the car-wheel on which the brake shoe is to act, accomplishing a number of advantages as will appear herefrom;

To provide a type of brake hanger bracket which is close up to the side frame, insuring great strength and including provision for attaching a bracket for holding the pivoted end of the dead lever; and To provide a type of braking mechanism wherein no cross members or attachment members are necessary for connecting the right rail and the left rail brakes together, such members being eliminated.

Further objects incidental to the improved braking mechanism are that lost motion and dead travel are entirely eliminated, so as to insure quick application of the brakes with the least possible travel. Also to provide for all adjustments and inspections from outside of the car truck, to facilitate the dismantling of the truck, to provide greater strength with less weight, and to supply railways with braking mechanism which can be economically maintained.

These being among the objects of the present invention, the same consists of certain features of construction and combinations of parts to be hereinafter described and then claimed with reference to the accompanying drawings illustrating one embodiment of the invention, in which:

Figure 1 is a side elevation of a portion of a car-truck, parts being in section, illustrating one unit of the assembled operating parts of the improved braking mechanism, the car-wheels being indicated in broken lines, and the brakes being off;

Fig. 2 is a side elevation of the same mechanism on a reduced scale so as to illustrate more of the truck, the brakes being set;

Fig. 3 is a side elevation of a portion of a car-truck side frame, illustrating some of the features of the present invention;

Fig. 4 is a sectional detail on the line 4—4, Fig. 1, showing certain details in the neighborhood of a brake-head;

Fig. 5 is a plan of portions of the car-truck and wheels showing two of the improved braking units connected with an equalizing lever for operation from air or hand-brake mechanism;

Fig. 6 is an enlarged transverse section on the line 6—6, Fig. 5, parts in elevation and parts broken away, and Fig. 7 is an elevation partly in section showing a detail of and incidental feature of the spring-plank which assists in guiding the brake-lever.

Referring to the drawings, the side frames 10, 11, respectively, of the car truck are respectively provided with the improved complete braking units for acting upon each of the car-wheels 12, 13, 14 and 15. To avoid undue repetition, the braking unit located adjacent the side frame 10 for cooperation with the wheels 12, 13 will be principally described, the corresponding mechanism at the other side frame 11 for car-wheels 14, 15 mostly bearing the same reference characters.

The truck-bolster 16 and spring-plank 17 are illustrated, but the truck springs and other such concomitant parts are omitted for the sake of clearness. The bolster 16 is presumed to be of that type which has a massive body between its ends and nearer to the spring plank than the ends, so that there is but little space between the ends and only between the ends of the bolster and the spring-plank, especially when the truck springs are under the action of considerable load. Also as the present invention relates more particularly to brake mechanism of the inside hung-type, the spaces between the bolster and spring-plank on the one hand and the car wheels on the other hand are very much and necessarily restricted, so that the braking mechanism must be accommodated to the contracted spaces which are provided by the whole car-truck frame structure.

The side frame 10 is provided with a pair of hanger brackets 18, 19 which are of relatively short length and which extend downwardly from the frame and diverge outwardly away from each other. These hanger brackets are preferably cast integrally with the side frame, being located on the inner side of such frame and extending in a plane substantially parallel with the vertical plane of the car-wheels 12, 13. Each of these brackets is formed with a fork 20, and between the bifurcations of the forks of the respective brackets there is fulcrumed the upper ends of the hangers 21, 22, which are supported by the pivots 23 which in turn are supported by said forks. It will be observed that the pivots 20 are separated a considerable distance from the vertical plane of the spring plank 17, so as to allow of suitable swinging movements of the hangers 21, 22 whose upper portions are inclined outwardly from the spring plank and towards the said pivots. As shown more clearly in Fig. 6, the lower ends of the hangers 21, 22 are deflected at 24 inwardly away from the corresponding side frame, so as to position the lower arms or extensions 25 of the hangers in the vertical plane of the corresponding car-wheel. Each hanger arm 25 is formed by an extension toward the car wheel, of the deflected lower end of the hanger, so that viewing the hanger from side elevation, Fig. 1, it appears of substantially L-shape, the head of the L being downward and the stem of the L extending upwardly. The so described double offsetting of each hanger is desirable in order to enable the hanger to have full throw in the contracted space allowed for it between the spring plank and car-wheel. The brake-head pivots 26 are carried by the outer extremities of the arms 25 of the respective hangers 21, 22.

A live lever 27 and a dead lever 28, each preferably formed in elbow shape, are provided to constitute a pair of brake levers corresponding with the pair of hangers adjacent thereto. The lower ends of the live and dead levers 27, 28, respectively, are fulcrumed upon the pivot pins 26 at the lower ends of the hangers, the extremity of each hanger being forked, as shown in Fig. 4, to accommodate the corresponding brake lever within the fork. A horizontal rod 29 is provided with upwardly extending outwardly deflected fork-portions 30, and pivot pins 31 pass through the forks and provide fulcruming points for the live and dead levers which are embraced by the forks, said pivots extending through the region of the elbows 32 of the live and dead levers. It will be seen that these elbowed levers 27, 28 of each pair have their elbows directed one towards the other, and this arrangement is desirable also because of the contracted spaces in which said levers must work together with the hangers.

As is shown more clearly in detail in Fig. 7, the connecting rod 29 passes through guide-plates 33, one at each side of the spring plank 17, as shown in Fig. 1. For the purpose the guide-plates 33 are provided with vertical recesses or slots 34, each of the plates being provided with a transverse shoulder 35 which bears upon an adjacent portion of the spring plank 17, the plate being secured to the spring plank by a rivet 36. In this manner the guiding portions of the plates 33 are maintained rigidly in upstanding position, so as to provide reliable guiding means for the connecting rod 29 which moves longitudinally and up and down through the recesses or slots 34. The offsetting of the ends of the connecting rod 29 is desirable in order to permit the bolster 16 to move up and down in the car frame, and also to prevent damage to the levers and parts connected together by the rod 29.

When as in the present invention the brake-shoe heads are each supported from a single pivot, it is necessary that some means be provided for centering the brake-shoes with reference to the car-wheels. In the present invention not only is this done, but each brake-head is centered through the medium of a fixed portion of the particular hanger supporting it. One way of centering the brake shoes is shown clearly in Figs. 1, 4 and 6. The brake-shoe heads 37, 38 are located with respect to the truck side frame 10 and support the brake-shoes 39, 40 through the medium of the well known removable keys 41, which enable replacements of the brake-shoes when they are worn beyond further use. Each brake-shoe head is provided with parallel back flanges 42, which provide a recess between them which is spanned by the common pivot 26. It will be observed that the lower portion 24 of each hanger is deflected lengthwise of the common pivot connecting that hanger with the corresponding brake-lever, and that the lower arm or extension 25 consists of a deflection of the particular hanger in a direction transversely of the common pivot. This brings the attaching end of the hanger directly to one side of the common pivot. Each hanger is provided with a toe 43 which is in reality a prolongation of the arm or extension 25 beyond the common pivot which it supports, and said toe is terminated by an inclined flat surface 44. Suitably supported by each brake head between its side flanges 42 and underneath the common pivot 26, is a bowed plate spring 45 or an irregularly formed spring, one end of which is preferably retained by inserting it in a pocket underneath an integral lip 46 formed on the brake head. Preferably this end of the spring is not secured by any positive fastening, and the spring is simply supported by gravity underneath the lip 46 in such way as to allow complete flexure of the spring. The brake head is furthermore provided with an integral lug 47 located between the side flanges and which constitutes an abutment for the upper end of the spring during its flexing moment. Each bowed or irregular spring 45 is provided with a flat portion 48 which rests against the inclined flat surface 44 of the corresponding hanger, as shown clearly in Fig. 1. It will be seen that when the brake is operated each brake-shoe will be properly pushed against the tread of its corresponding car wheel, partially due to the fact that the spring 45 holds the brake-shoe centered, the spring 45 yielding if necessary in order to enable the shoe to engage concentrically with the tread of its car wheel.

Consequently centralization of the brake-shoe is always accomplished through the medium of the fixed purchase point furnished by the inclined toe of the hanger, upon which the bowed spring bears, and the brake-shoe will tend to wear evenly rather than irregularly.

Referring more particularly to Figs. 3, 4 and 6, it will be seen that each side frame 10 and 11 of the car truck is provided with inwardly protruding wear or confining portions 49 which are preferably cast integrally with the side frame and have flat wear surfaces. These are located underneath the hanger brackets 20, and are arranged intermediately of the length of the hangers, one for each hanger to bear on or be guided by during the swinging of the hanger. Each wear portion 49 will therefore prevent the corresponding hanger from moving sidewise towards the center of the car-truck, and will keep the toe 43 of the hanger in the desired plane of action. On the other hand one of the edges 34a or wear portions of each spring plank plate 33 may afford a bearing for one side of connecting rod 29, thus preventing the brake-lever 27 or 28 from an outward sidewise movement relatively to the car-truck, and tending to maintain the lower end of the lever in the desired plane of action. There are therefore provided by the wear or confining portions 49 on the one hand and the wear or confining portions or edges 34a on the other hand means for guiding the unitary brake mechanism at each side of the car truck and confining the same for preventing movement to either side of the plane of the required movement of the brake-heads at the same side of the truck.

Suitable means are provided for fulcruming the upper end of each dead lever 28, which means may consist of a rigidly mounted bracket 50 which is riveted to the corresponding hanger bracket 18 and which is of angular formation as shown more clearly in plan, Fig. 5. A duplex jaw-member or guide link 51 is connected by a pivot 52 with the corresponding hanger bracket and with the outer end of the bracket 50, the inner end of the member or link 51 being received in the space provided at this point. It is preferred to offset portions of the jaw-member or link 51 so as to bring the swinging outer end thereof into the desired vertical plane of the corresponding car-wheel, and the free end of the member or link 51 is connected by a pivot 53 with the upper end of the corresponding dead lever 28.

For the purpose of actuating the improved brake mechanism, the complete braking units at the sides of the truck are operable by pull rods 54, 55 which converge somewhat towards the center line of the car truck. One end of each push rod is forked and receives the upper end of the live lever 27, a pivot 56 passing through the fork and said lever. The other ends of the push-rods 54, 55 are respectively pivotally connected with the opposite ends of an equalizing lever 57 which in turn is connected with an actuating rod 58 which is controlled from the air or hand brake mechanism which may be used for effecting the operation of the brakes.

Before briefly summing up the arrangement and operation of the parts it is to be understood that a freight car has both a spring plank and a bolster, and these are so arranged as to make the spaces between them and the car wheels very much restricted. To accommodate the mechanism to these restricted spaces it is preferred to connect the hangers 21, 22 and the live and dead levers 27, 28 by the same pivots 26 for the brake shoe heads and to provide live and dead levers which are of elbow shape, with the elbows presented toward each other.

Furthermore, with such end in view, to fulcrum the live and dead levers at their elbows on pivots 31 which are at the opposite ends of a transverse rod 29 which extends between the spring plank 17 and bolster 16, so that the live and dead levers are connected in a pair, the upper portions of said levers being deflected away from each other at points above the fulcrums 31 and the lower portions of the levers being deflected away from each other below the said fulcrums, but preferably to a less degree than the upper portions. The result of such construction and combination of elements is that the fulcrums of the levers will lie in substantially the horizontal plane of the axes of the car wheels, with which they are associated, but in the most contracted portions of the spaces between the car wheels and the two obstructing parts, namely, the bolster and the spring plank. Also the fulcrum 31 and the two pivots at the opposite ends of each of the levers 32 will all be located at approximately the same distance from the tread of the adjacent car wheel, and all three of them will therefore lie normally along a line which is approximately concentric with the tread of the adjacent car wheel. Preferably in these connections it is best to have substantially the entire lengths of the hangers at points above the brake head pivots 26 extend at an inclination outwardly from the opposite sides of the spring plank, and to locate the hangers so as to be positioned substantially closer to the bolster and spring plank than are the live and dead levers.

It will be seen that the parts of the improved mechanism may be economically manufactured inasmuch as each half of each braking unit at each side of the car truck is composed of parts which are preferably identical with corresponding parts of the braking mechanism, so that each of the moving parts is interchangeable with each of the other and corresponding moving parts.

It is obvious that various changes and modifications may be resorted to by those skilled in the art without departing from the principles and spirit of the invention and still be within the scope of the appended claims.

What I claim as new is:

1. In a braking mechanism for railway cars, of the inside-hung type, in combination, a car-truck side frame, truck bolster, spring plank and brake-shoe heads, swingable hangers suspending the brake-shoe heads from the side frame, pivots connecting the lower ends of the hangers with the brake-heads, live and dead levers pivotally connected at the said pivots and terminating thereat, a rod connecting the live and dead levers in a pair and extending between the truck bolster and spring plank, means for pivotally supporting the upper end of the dead lever, and operating mechanism connected with the upper end of the live lever.

2. In a braking mechanism for railway cars, of the inside-hung type, in combination, a car-truck side frame, truck bolster, spring plank and brake-shoe heads, swingable hangers suspending the brake-shoe heads from the side frame, pivots connecting the lower ends of the hangers with the brake-heads, the lower portions of the hangers being deflected inwardly in a direction lengthwise of the pivots, means between the upper ends of the hangers and their deflected portions for guiding the hangers, live and dead levers pivotally connected at the said pivots, a rod connecting the live and dead levers in a pair and extending between the truck bolster and spring plank, means for pivotally supporting the upper end of the dead lever, and operating mechanism connected with the upper end of the live lever.

3. In a braking mechanism for railway cars, of the inside-hung type, in combination, a car-truck side frame, truck bolster, spring plank and brake-shoe heads, swingable hangers suspending the brake-shoe heads from the side frame, pivots connecting the lower ends of the hangers with the brake-heads, the hangers being deflected inwardly in a direction transverse of the pivots, live and dead levers pivotally connected at the said pivots, a rod connecting the live and dead levers in a pair and extending between the truck bolster and spring plank, means for pivotally supporting the upper end of the dead lever, and operating mechanism connected with the upper end of the live lever.

4. In a braking mechanism for railway cars, of the inside-hung type, in combination, a car-truck side frame, truck bolster, spring plank and brake-shoe heads, swingable hangers suspending the brake-shoe heads from the side frame, pivots connecting the lower ends of the hangers with the brake-heads, the hangers being deflected intermediately in a direction longitudinally of the pivots and deflected at their lower ends transversely toward the pivots, said hangers being substantially L-shaped live and dead levers pivotally connected at the said pivots, a rod connecting the live and dead levers in a pair and extending between the truck bolster and spring plank, means for pivotally supporting the upper end of the dead lever, and operating mechanism connected with the upper end of the live lever.

5. In a braking mechanism for railway cars, of the inside-hung type, in combination, a car-truck side frame, truck bolster, spring plank and brake-shoe heads, swingable hangers suspending the brake-shoe heads from the side frame, pivots connecting the lower ends of the hangers with the brake-heads, the truck having a contracted space at each side of the spring plank between the car wheels and spring plank on one side and the car wheels spring plank on the other side, live and dead levers pivotally connected at the said pivots, a rod connecting the live and dead levers in a pair and extending between the truck bolster and spring plank, the hangers and levers being bent to suit the contracted spaces and terminating at opposite sides of the spring plank, means for pivotally supporting the upper end of the dead lever, and operating mechanism connected with the upper end of the live lever.

6. In a braking mechanism for railway cars, of the inside-hung type, in combination, a car-truck side frame, truck bolster, spring plank and brake-shoe heads, swingable hangers suspending the brake-shoe heads from the side frame, pivots connecting the lower ends of the hangers with the brake-heads, live and dead levers pivotally connected at the pivots, a rod connecting the live and dead levers in a pair and extending between the truck bolster and spring plank, and having upwardly deflected ends to the points of connection, means for pivotally supporting the upper end of the dead lever, and operating mechanism connected with the upper end of the live lever.

7. In a braking mechanism for railway cars, of the inside-hung type, in combination, a car-truck side frame, truck bolster, spring plank and brake shoe heads, brackets rigid with the frame and extending downwardly and diverging outwardly, swingable hangers pivoted to the brackets for suspending the brake-shoe heads from the side frame, pivots connecting the lower ends of the hangers with the brake-heads, the hangers being deflected inwardly in a direction lengthwise of the pivots, live and dead levers of elbow shape pivotally connected at the said pivots, the elbows being presented toward one another, a rod connecting the live and dead levers in a pair at the elbows, and extending between the truck bolster and spring plank, means for pivotally supporting the upper end of the dead lever, and operating mechanism connected with the upper end of the live lever.

8. In a braking mechanism for railway cars, of the inside-hung type, in combination, a car-truck side frame, truck bolster, spring plank and brake shoe heads, swingable hangers suspended from the frame, live and dead levers, the lower ends of the hangers and levers being pivotally connected with the brake-shoe heads, a rod connecting the live and dead levers and extending between the truck bolster and spring plank, the spring plank having vertical recesses through which the connecting rod passes, means for pivotally supporting the upper end of the dead lever, and operating mechanism connected with the upper end of the live lever.

9. In a braking mechanism for railway-cars, of the inside-hung type, in combination, a car-truck side frame, truck bolster, spring plank and brake-shoe heads, swingable hangers suspended from the frame, means on the frame for guiding the hangers intermediate of their ends, live and dead levers, the lower ends of the hangers and levers being pivotally connected with the brake-shoe heads, a rod connecting the live and dead levers and extending between the truck bolster and spring plank, the spring plank having vertical recesses through which the connecting rod passes, means for pivotally supporting the upper end of the dead lever, and operating mechanism connected with the upper end of the live lever.

10. In a braking mechanism for railway-cars, of the inside-hung type, in combination, a car-truck side frame, truck bolster, spring plank and brake-shoe heads, swingable hangers suspended from the frame, wear portions projecting from and integral with the frame for guiding the hangers, live and dead levers, the lower ends of the hangers and levers being pivotally connected with the brake-shoe heads, a rod connecting the live and dead levers and extending between the truck bolster and spring plank, the spring plank having vertical recesses through which the connecting rod passes, means for pivotally supporting the upper end of the dead lever, and operating mechanism connected with the upper end of the live lever.

11. In a braking mechanism for railway-cars, of the inside-hung type, in combination, a car-truck side frame, truck bolster, spring plank and brake-shoe heads, swingable hangers suspended from the frame, means on the frame for guiding the hangers intermediate of their ends, live and dead levers, the lower ends of the hangers and levers being pivotally connected with the brake-shoe heads, a rod connecting the live and dead levers and extending between the truck bolster and spring plank, means for pivotally supporting the upper end of the dead lever, and operating mechanism connected with the upper end of the live lever.

12. In a braking mechanism for railway cars, the combination with a truck frame, of a hanger pivotally supported from the truck frame, a head provided with a brake-shoe and pivotally connected with the hanger at approximately its mid-length, and resilient means between the hanger and brake-head, and the hanger and resilient means having mutually engaging flat surfaces for maintaining the concentricity of the shoe with a car-wheel.

13. In a braking mechanism for railway cars, the combination with a truck frame of a hanger pivotally supported from the truck frame, a head provided with a brake-shoe and pivotally connected with the hanger at approximately its mid-length, a bowed plate-spring mounted on the head, and the hanger and spring bearing one on the other at a point between the pivot connecting them and the head, the bearing surfaces being flat.

14. In a braking mechanism for railway cars, the combination with a truck frame, of a hanger pivotally supported from the truck frame, a head provided with a brake-shoe and pivotally connected with the hanger at approximately its mid-length, a bowed plate-spring mounted on the head and having a flattened intermediate portion, and the adjacent end of the hanger having an inclined flat surface bearing upon the flattened portion of the spring.

15. In a braking mechanism for railway cars, of the inside-hung type, in combination, a car-truck structure, a hanger swingably supported by the structure, a brake-head pivotally supported by the hanger, and means extending in the direction of movement of the brake-head for preventing lateral movement of the hanger and brake head and compelling the hanger and brake head to operate in the vertical plane of the corresponding car-wheel.

16. In a braking mechanism for railway cars, of the inside-hung type, in combination, a car-truck structure, a hanger swingably supported by the structure, a brake-head pivotally supported by the hanger, and stationary means on the structure arranged laterally of the hanger and extending in the direction of movement of the brake-head for preventing lateral movement of the hanger and brake head and compelling the hanger and brake head to operate in the plane of the corresponding car-wheel.

17. In a braking mechanism for railway cars, of the inside-hung type, in combination, a car-truck structure, a hanger swingably supported by the structure, a brake-head pivotally supported by the hanger, a lever pivoted to the brake-head, and means lateral of the hanger for guiding the hanger to move in the plane of the corresponding car-wheel.

18. In a braking mechanism for railway cars, of the inside-hung type, in combination, a car-truck structure, a hanger swingably supported by the structure, a brake-head pivotally supported by the hanger, a lever pivoted on the brade-head, and means on the structure for respectively guiding the hanger and lever and compelling them to operate on the brake-head in the plane of the corresponding car-wheel.

19. In a braking mechanism for railway cars, of the inside-hung type, in combination, a car-truck structure, a hanger swingably supported thereby, a brake-head, a lever, a single pivot connecting the lower ends of the hanger and lever with the brake-head, the hanger, lever and head constituting a unitary mechanism, and guiding means for the unitary mechanism and confining the same for preventing the same from moving to either side of the plane of the required movement of the brake-head.

20. In a braking mechanism for railway cars, the combination of a hanger suspended from the side frame and having a fork at its lower end, a brake-shoe head having a back recess, a pivot passing through the fork, the recess and the brake head, a lever fulcrumed on the said pivot and having its lower end in the fork, and a spring located in the recess at a point between the head and the terminals of the lever and fork, and bearing on the fork.

21. In a braking mechanism for railway cars, of the inside-hung type, in combination, a car-truck side frame, truck bolster, spring plank and brake-shoe heads, hangers pivotally mounted at their upper ends upon the side frame, pivots connecting the lower ends of the hangers with the brake-heads, live and dead levers of elbow shape, the elbows presented toward each other, and the levers being connected at their lower ends with said pivots, a transverse rod upon the ends of which the live and dead levers are fulcrumed at their elbows in a pair and the rod extending between the truck bolster and spring plank, the upper portions of the levers being deflected away from each other at points above the fulcrums and the lower portions of the levers being deflected away from each other below the fulcrums to a less degree than the upper portions, means for pivotally supporting the upper end of the dead lever, and operative mechanism pivotally connected with the upper end of the live lever.

22. In a braking mechanism for railway cars, of the inside-hung type, in combination, a car-truck side frame, truck bolster, spring plank and brake-shoe heads, hangers pivotally mounted at their upper ends upon the side frame, pivots connecting the lower ends of the hangers with the brake-heads, substantially the entire lengths of the hangers above said pivots extending at an inclination outwardly from the opposite sides of the spring plank, live and dead levers of elbow shape, the elbows presented toward each other, and the levers being connected at their lower ends with said pivots, a transverse rod upon the ends of which the live and dead levers are fulcrumed at their elbows in a pair and the rod extending between the truck bolster and spring plank, the upper portions of the levers being deflected away from each other at points above the fulcrums and the lower portions of the levers being deflected away from each other below the fulcrums to a less degree than the upper portions, and the hangers lying substantially closer to the bolster and spring plank than the levers, means for pivotally supporting the upper end of the dead lever, and operating mechanism pivotally connected with the upper end of the live lever.

23. In a braking mechanism for railway cars, of the inside-hung type, in combination, a car-truck side frame, car wheels at that side, truck bolster, spring plank and brake-shoe heads, hangers pivotally mounted at their upper ends upon the side frame, pivots connecting the lower ends of the hangers with the brake-heads, live and dead levers of elbow shape, the elbows presented toward each other, and the levers being connected at their lower ends with said pivots, a transverse rod upon the ends of which the live and dead levers are fulcrumed at their elbows in a pair and the rod extending between the truck bolster and spring plank, the upper portions of the levers being deflected away from each other at points above the fulcrums and the lower portions of the levers being deflected away from each other below the fulcrums to a less degree than the upper portions, means for pivotally supporting the upper end of the dead lever, and operating mechanism pivotally connected with the upper end of the live lever, the fulcrums of the levers lying in substantially the horizontal plane of the axes of the car wheels, and the fulcrum and end pivots of each live and dead lever, all located at approximately the same distance from the tread of the adjacent car wheel.

CHARLES R. BUSCH.